United States Patent [19]
Husain et al.

[11] Patent Number: 4,687,671
[45] Date of Patent: Aug. 18, 1987

[54] CONCENTRATION METHOD

[75] Inventors: Matloob Husain, Wheaton; Ban-Yen Lai, Willowbrook, both of Ill.

[73] Assignee: Chicago Bridge & Iron Company, Oak Brook, Ill.

[21] Appl. No.: 766,972

[22] Filed: Aug. 19, 1985

[51] Int. Cl.$^4$ .............................................. A23L 2/12
[52] U.S. Cl. .................................. 426/384; 426/387; 426/492; 426/495; 426/599
[58] Field of Search ............... 426/384, 385, 386, 387, 426/478, 490, 492, 495, 590, 599

[56] References Cited

U.S. PATENT DOCUMENTS

| | | | |
|---|---|---|---|
| 1,379,470 | 5/1921 | Monti | 426/384 |
| 2,641,550 | 6/1953 | Dykstra et al. | 426/386 |
| 3,044,887 | 7/1962 | Smith et al. | 426/387 |
| 3,061,448 | 10/1962 | Mojonnier et al. | 426/387 |
| 3,118,776 | 1/1964 | Byer et al. | 426/492 |

*Primary Examiner*—Raymond N. Jones
*Assistant Examiner*—Marianne M. Cintins
*Attorney, Agent, or Firm*—Marshall, O'Toole, Gerstein, Murray & Bicknell

[57] ABSTRACT

A method for concentrating aqueous mixtures and particularly mixtures which contain volatile desirable components such as flavor constituents is disclosed. An aqueous feed mixture is cooled sufficiently to produce ice crystals therein. The ice crystals are removed from the chilled mixture to produce a liquid phase from which some of the water has been removed and which is therefore concentrated. The concentrated liquid phase is split into two portions, one of which is collected as a first product, the other being first treated to separate the volatile components, which are recycled to the freezing step in which the ice crystals are formed. The residual liquid after the volatile component separation is then concentrated thermally in a conventional fashion to produce a second concentrated product which can be mixed with the first product to produce a product having a desired solids concentration and containing at least a substantial proportion of the original volatile components present in the feed.

5 Claims, 1 Drawing Figure

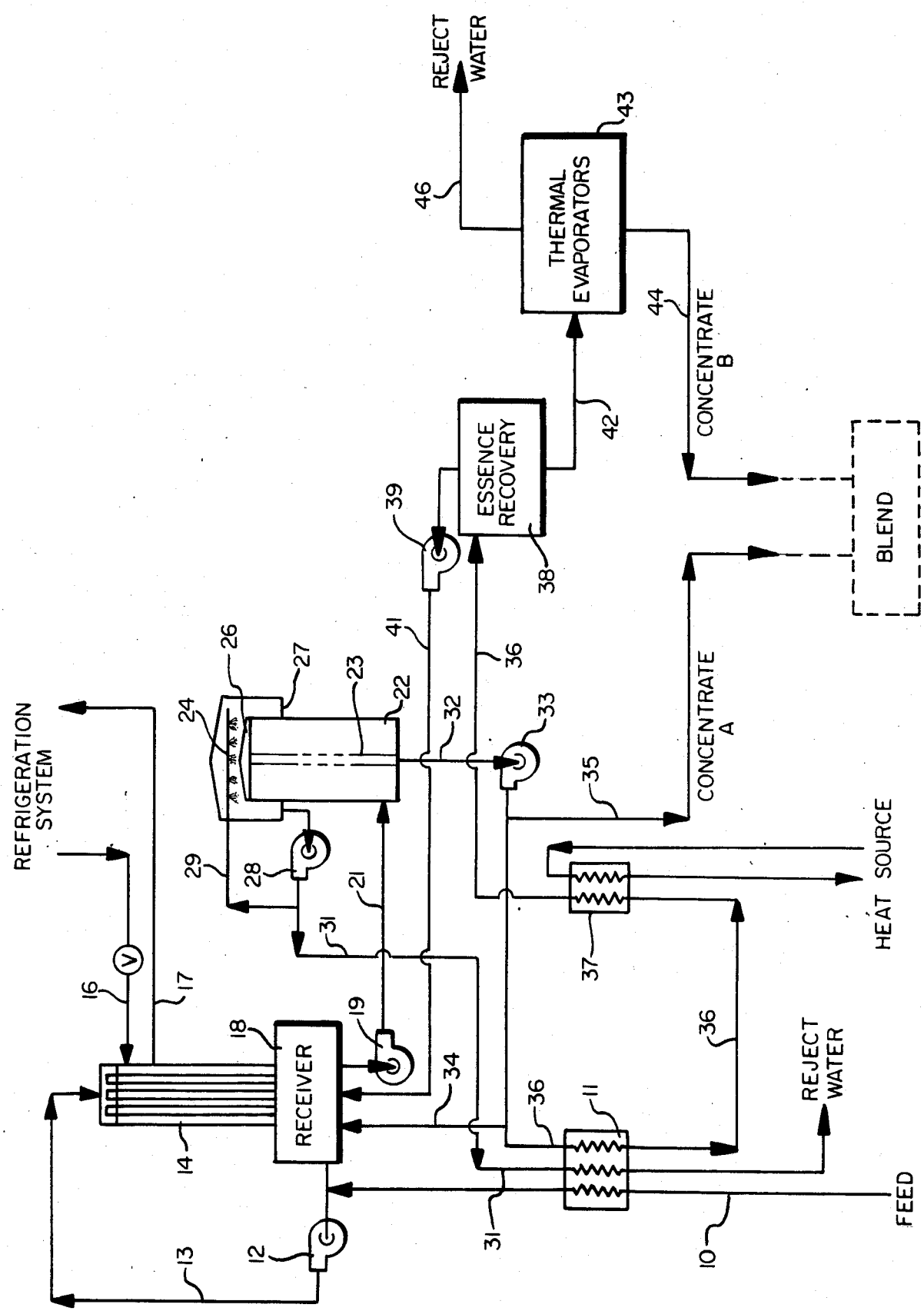

CONCENTRATION METHOD

The present invention relates to apparatus for and method of concentrating an aqueous liquid mixture containing a desirable volatile fraction, using a combination of freeze concentration and evaporative concentration.

BACKGROUND OF THE INVENTION

It is often desired to concentrate a liquid mixture or solution by removing a portion of the solvent therefrom, leaving the mixture in a more concentrated form. It has been common to concentrate aqueous mixtures such as orange juice, grapefruit juice, grape juice, tomato and other fruit and vegetable juices by evaporation of a portion of the water content. In general, the removal of water from a mixture by evaporation requires substantial energy, since the latent heat of vaporization of water is large. Further, when the evaporation is carried out at elevated temperatures, as is most common, scaling and increased corrosion of the equipment are produced. In addition, with some products, notably fruit juices, heating of the mixture either drives off volatile flavor constituents or otherwise adulterates these materials, thus creating an adulterated or cooked flavor in the final product.

Because of the above-described shortcomings associated with evaporative concentration, it has been found advantageous to freeze concentrate many products, particularly those having water as the liquid carrier. Generally, reduced energy is required since freeze concentrating relies on the latent heat of fusion of water, which is much less than its latent heat of evaporation. In a freeze concentration process, water is removed by cooling the mixture to produce ice crystals, which are separated from the concentrate. As water is removed by freeze concentration, however, the freezing point of the remaining liquid phase becomes increasingly depressed because of the rising solids concentration, thus requiring lower freezing temperatures. In addition, the viscosity of the remaining liquid increases, thus making the separation and washing of the ice crystals increasingly difficult and expensive.

SUMMARY OF THE INVENTION

In accordance with the present invention, there is provided apparatus and a method involving both evaporative and freeze concentration procedures for concentrating aqueous mixtures and particularly mixtures which contain volatile desirable components such as flavor constituents.

In accordance with the method of the invention, an aqueous feed mixture is cooled sufficiently to create ice crystals therein. The ice crystals are removed from the chilled mixture to produce a liquid phase from which some of the water has been removed and which is therefore concentrated. The concentrated liquid phase is split into two portions, one of which is collected as a first product, the other being first treated to separate the volatile components, which are recycled to the freezing step in which the ice crystals are formed. The residual liquid after the volatile component separation is then concentrated thermally in a conventional fashion to produce a second concentrated product which can be mixed with the first product to produce a product having a desired solids concentration and containing at least a substantial proportion of the original volatile components present in the feed.

The method of the invention has several advantages over concentrating methods heretofore known. The initial freeze concentrating step is carried out to the maximum practical extent imposed by consideration of freezing temperature and product viscosity. Because the water is removed by freezing in this portion of the process, the concentration is effected in an economical manner. The water in the remaining feed is removed by conventional thermal evaporation, but before evaporation occurs, the desirable volatile fraction constituting the flavor components is removed and recycled to the freeze concentrator. In this way, the flavor components are never exposed to elevated temperatures so that no degradation therein occurs. The thermal evaporation is carried out on a product which can withstand the elevated temperature encountered in such a processing operation.

BRIEF DESCRIPTION OF THE DRAWING

The accompanying drawing is a schematic diagram of a concentrating process in accordance with the invention, incorporating freeze concentration, thermal concentration, and removal of a volatile fraction prior to the thermal concentrating step.

DETAILED DESCRIPTION OF THE DRAWING

With reference to the drawing, a liquid mixture feed stream is fed by conduit 10 to heat exchanger 11 wherein it is cooled by indirect heat exchange with a stream to be described. Emerging from heat exchanger 11, the feed stream passes via pump 12 and conduit 13 to the tube side of a shell-and-tube freeze exchanger 14, to the shell side of which conduit 16 supplies an appropriate liquid refrigerant from a refrigeration system (not shown). Conduit 17 returns vaporized refrigerant to the refrigeration system. A suitable shell-and-tube freeze exchanger is disclosed in U.S. Pat. No. 4,314,455 of Gerald Engdahl. As the liquid feed mixture flows downwardly in freeze exchanger 14, its temperature is lowered sufficiently to cause the formation of ice crystals. The ice-containing feed mixture flows out the bottom of freeze exchanger 14 into receiver 18. The liquid phase from the mixture in receiver 18 is recirculated by pump 12 to the top of heat exchanger 14 in order to generate more ice and to maintain an optimum slurry of ice and liquid in receiver 18.

A slurry of ice and liquid is fed from the bottom of receiver 19 by pump 18 and conduit 21 to the lower end of wash column 22 wherein the ice is separated from the liquid and also washed to remove adhering concentrated liquid. A suitable wash column is disclosed in U.S. Pat. No. 4,341,085, issued to James A. Nail on July 27, 1982. Within wash column 22, the ice crystals, being more buoyant than the liquid, rise to the top of the column, the liquid being drained from the column by means of a perforated central column 23. The fraction of ice in the slurry within the wash column increases towards the top and eventually forms an ice pack with a thin layer of liquid adhering to the ice crystals. The packed ice bed moves slowly upward in wash column 22 as a result of hydraulic force and a buoyancy effect. As the bed rises, it becomes uniform in composition and evenly packed. On reaching the top of the column, it is washed by means of a spray of clean water through spray nozzle 24 which displaces the adhering juice film from the ice crystals. The heavier juice flows downwardly and clear ice slush moves upwardly. At the top of column 22 a rotating cutter 26 continuously scrapes the ice bed as it rises above the rim of the wash column. The harvested ice slush drops into annular space 27 outside the wash column, wherein it is melted to form cold water, a portion of which is recycled via pump 28 and conduit 29 to spray nozzle 24. The remaining cold water passes via conduit 31 to heat exchanger 11 wherein it is used to precool the entering feed in line 10.

The concentrated liquid leaving wash column 22 via conduit 32 and pump 33 is split into three streams. A first stream, flowing in conduit 34, is recycled to receiver 18 to maintain a suitable ice slurry therein; a second stream, flowing in conduit 35, is a product which can be used as is or mixed with other products; a third stream passes via conduit 36 initially through precooler 11 and then through heat exchanger 37 wherein it is heated by means of any suitable heating medium from an appropriate heat source. Leaving heat exchanger 37, the heated product stream passes to essence recovery stage 38 wherein a volatile fraction, typically containing flavor components, is separated in any suitable manner, e.g., by flashing the heated concentrated stream in line 36 and condensing the evolved vapors which consist of the more volatile components of the entering feed stream. These condensed vapors are then recycled by means of pump 39 and conduit 41 to receiver 18.

The residual liquid in essence recovery stage 38, from which the volatile components have been separated, passes via conduit 42 to conventional thermal evaporators 43 in which any desired fraction of the remaining water is removed and discarded through conduit 46. The concentrated liquid product emerging from evaporators 43 via conduit 44 can be mixed with the product flowing in conduit 35 to produce a blended product as desired.

In the operation of evaporators 43, it may be convenient or economical to use as a source of heat, the refrigerant vapors removed from freeze exchanger 14, after compression. In this way, the evaporators function as condensers for the refrigeration system which provides the refrigerant used in the freeze exchanger.

In the operation of the method of the invention, it will be seen that, because the volatile essence is removed from the stream entering thermal evaporators 43 and recycled to receiver 18, little or none of the volatile fraction is exposed to the elevated temperature conditions which typically exist in such thermal evaporators. Accordingly, the volatile constituents are not driven off nor degraded in quality as they might be by such exposure. Depending on the efficiency of essence recovery stage 38, such volatile components are retained and discharged from the system together with the concentrate A in conduit 35.

Although the invention has been described in connection with the processing of fruit juice, it is not restricted thereto. The process can be used to advantage to concentrate any aqueous mixture or solution containing a valuable and relatively volatile fraction. Other products which can be advantageously concentrated using the process of the invention include coffee, tea, wine, beer and other beverages, perfume essences, and pharmaceutical products. The foregoing detailed description has been given for clearness of understanding only and no unnecessary limitations should be understood therefrom as modifications will be obvious to those skilled in the art.

What is claimed:

1. A method for concentrating an aqueous liquid mixture containing therein a volatile fraction having a boiling point substantially below that of water, said method comprising the steps of:
    A. cooling said mixture sufficiently to cause the production of ice crystals therein;
    B. separating said ice crystals from said mixture to produce a first liquid concentrate;
    C. dividing said first liquid concentrate into a first stream and a second stream;
    D. recovering said first stream as a first concentrated product;
    E. separating said volatile fraction from said second stream and recycling said volatile fraction to cooling step A; and
    F. thermally concentrating a product remaining in step E after separation of said volatile fraction and recovering a second concentrated product.

2. A method in accordance with claim 1 wherein a portion of said liquid concentrate produced in step B is recycled to step A.

3. A method in accordance with claim 1 further including the step of mixing said first and second concentrated products.

4. A method in accordance with claim 1 wherein said liquid mixture is a fruit juice.

5. A method in accordance with claim 4 wherein said fruit juice is orange juice.

* * * * *